Sept. 14, 1948.   J. WEINGARTEN   2,449,093

CATHODE RAY TUBE CALIBRATION

Filed May 14, 1946

INVENTOR
JOSEPH WEINGARTEN

BY  *M<sup>c</sup>Hayes*

ATTORNEY

Patented Sept. 14, 1948

2,449,093

UNITED STATES PATENT OFFICE 2,449,093

CATHODE RAY TUBE CALIBRATION

Joseph Weingarten, New York, N. Y.

Application May 14, 1946, Serial No. 669,557

38 Claims. (Cl. 250—164)

(Granted under the act of March 3, 1883, as amended April 30, 1928; 370 O. G. 757)

The present invention relates in general to the problem of providing predetermined calibration markings for a cathode ray tube, and more particularly to individual cathode ray tube calibration utilizing photographic techniques.

The cathode ray tube is widely used in electrical apparatus for the observation and measurement of voltage and current waveforms. Briefly, the conventional type cathode ray tube comprises an electrode structure, known as an electron gun, for generating an electron beam within a glass or other suitable envelope. The electron beam is normally focussed to a sharply defined point upon a fluorescent screen in the face of the tube, thereby providing a luminous spot. Deflection means, in the form of orthogonal electrodes (electrostatic) or coils (electromagnetic) permit displacement of the spot in a predetermined pattern to form a visible trace upon the screen.

In numerous well known equipments, cathode ray tubes are used solely for qualitative study of waveform, or for aid in determining maxima and minima, and consequently require neither calibration nor reference markings. On the other hand, the cathode ray tube is employed in analytical apparatus, as for example, oscillographs and spectrum analyzers, wherein precise measurements of the trace appearing on the screen are essential. Calibrated markings must be provided for the latter applications.

Heretofore, it has been the practice to perform quantitative analysis of a cathode ray tube trace with the aid of a scale, ordinarily in the form of a rectangular coordinate system of uniformly spaced lines printed upon a transparent sheet, such as Celluloid. One scale, well known in the art of oscillography, is equipped with a plurality of integral tabs, normal to the plane of the coordinate system, which permit removable attachment to the cathode ray tube. Other such scales are machine printed and secured to the frame of the apparatus in front of the cathode ray tube screen.

It is generally known that the deflection sensitivity of a cathode ray tube, defined as the displacement of the fluorescent spot obtained for unit change of deflection potential or current, is a marked function of the position of the spot upon the screen. Therefore, the aforementioned scale systems are seriously handicapped by the fact that the distance between adjacent coordinate lines at one point on the tube screen is not representative of a deflection signal magnitude which will cause equal displacements at all other points on the screen. Calibration of such printed scales must thus be accomplished experimentally, and involves the accumulation of considerable data, which data have to be available before the cathode ray tube images may be successfully interpreted. Prior cathode ray tube coordinate scales have the further disadvantages of failing to take into account faults in tube construction, such as non-orthogonality of the deflection means; and of introducing errors due to parallax, since the printed scales are flat while tube screens generally are warped surfaces. For these reasons, careful experimenters have consistently avoided the use of large deflections, and have performed measurements in the central region of the tube whenever possible.

The present invention contemplates and has as a primary object the provision of a cathode ray tube screen marking which permits the successful utilization of the entire visible surface of tube screen for precise measurement.

In accordance with procedures to be described in detail hereinbelow, the cathode ray tube is marked photographically, the light emitted from the fluorescent spot providing the necessary exposure. Thus, a scale marking individual to the cathode ray tube is obtained by first applying a light sensitive substance in the form of a coating over the outermost face of the tube and adjacent to the fluorescent screen.

Normal operating potentials are then applied to the tube to produce a sharply defined spot which is deflected and varied in intensity in predetermined steps, exposing the light sensitive coating through the glass separation between sensitive coating and fluorescent screen. Conventional processing of the exposed coating provides scale markings, which by proper selection of the spot deflection pattern may be in the form of any desired coordinate system.

It is therefore another object of the present invention to provide a cathode ray tube screen with a readily applied, individual coordinate system. Still another object of this invention is to provide a cathode ray tube calibration consisting essentially of a developed light sensitive coating.

A further object of the present invention is to provide a coordinate system for a cathode ray tube which conforms physically with the surface of the tube and which substantially precludes errors due to parallax.

A still further object of the present invention is to provide apparatus for photographically calibrating a cathode ray tube.

Another object of this invention is the provision of calibrating apparatus for a cathode ray tube which may be manually or automatically operated and is readily adaptable to mass-production techniques.

A further object of this invention is to provide a cathode ray tube calibration scale of variable intensity lines spaced in accordance with a predetermined coordinate system.

These and other objects of the present invention will now become apparent from the following specification when taken in connection with the accompanying drawings in which.

Figure 1:
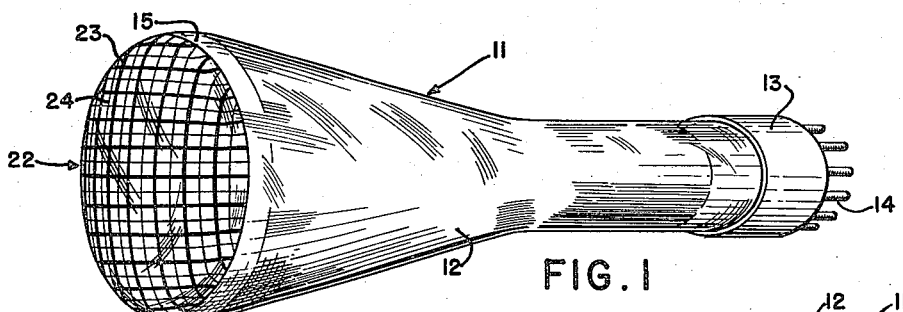
Fig. 1 is a general perspective view of a calibrated cathode ray tube.
Figure 2:
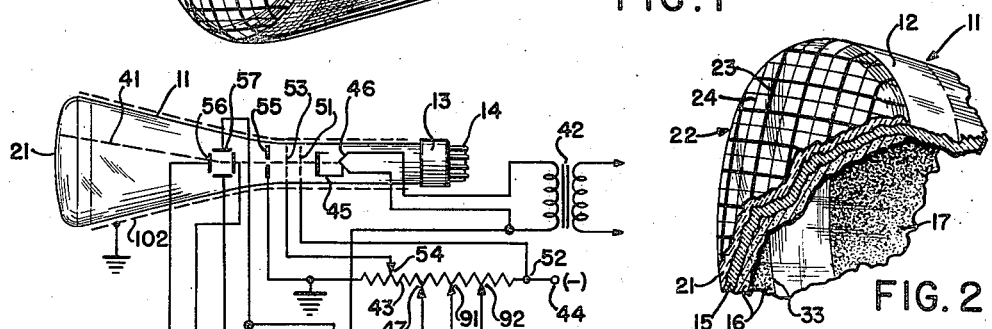
Fig. 2 is a fragmentary perspective view illustrating the structural details of the face of the cathode ray tube of Fig. 1.

With reference now to the drawings and more particularly to Figs. 1 and 2, there is illustrated, in part, the structure of a conventional cathode ray tube 11 comprising a glass or other suitable envelope 12, fitted with a tube base 13 and associated pins 14 for connection to an external circuit. The electrode system within the tube 11 for generating and deflecting an electron beam, has been omitted for clarity.

The glass face 15 of cathode ray tube 11 is an integral portion of the envelope 12, and is generally a warped surface, for reasons of mechanical strength; although some tube structures have a substantially flat face of considerable thickness. As is best shown in the broken view, Fig. 2, the inner surface of the glass face 15 is covered with a phosphor, or fluorescent screen material 16, responsive upon the impact of an electron beam to produce a luminous spot. An electrostatic shield in the form of a conductive paint 17, spaced from the screen 16 is coated over the inner surface of the glass envelope 12.

As is further illustrated, the outer surface of the tube face 15 is covered with a processed film of light sensitive material 21 marked with a rectangular coordinate system 22 of alternately heavy and light lines, 23 and 24 respectively. As will become apparent, the coordinate system plotted on the sensitive film 21 need not be limited to the orthogonal lines shown in the figures. However, before possible coordinate systems and the particular characteristics of the various lines thereof are discussed, the process of producing the same will be considered.

In accordance with the principles of this invention, the face of a conventional type cathode ray tube, of whatever size desired, is first filmed with an adhering light sensitive substance, preferably a silver halide emulsion of the type used for photographic plates and the like. The filming process is comparatively simple, and may be accomplished on a reduced scale in the manner illustrated in Fig. 4. In this figure, the cathode ray tube 11 is shown partially immersed in liquid sensitive emulsion 31 within vessel 32. The depth of immersion need only be sufficient to coat the outer surface of glass face 15 to the circular bounding edge 33 of the fluorescent screen 16. To preclude air bubbles and to obtain a uniform film, the tube 11 is rotated, as shown, during immersion.

Figure 3:
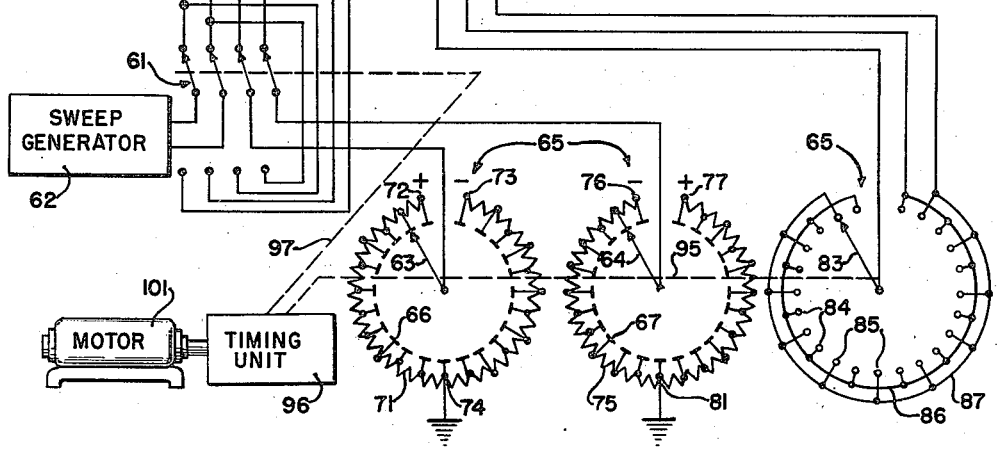
Fig. 3 is a schematic circuit diagram of apparatus for calibrating cathode ray tubes.
Figure 4:
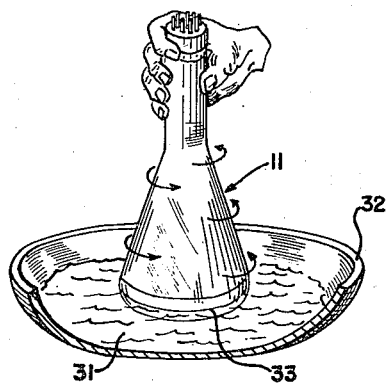
Fig. 4 is a perspective view, partly in section, illustrating a step in the process of cathode ray tube calibration as disclosed herein.

Subsequent to application, as in Fig. 4, the layer of sensitive emulsion 31 is dried upon the tube, thereby forming a coating 21 as illustrated in Fig. 2, adjacent to and separated from the fluorescent screen 16 by the thickness of glass 15. It is, of course, evident that the operation depicted in Fig. 4 is carried out under lighting conditions consistent with the nature of the sensitive material 31. Preferably, this emulsion is of high contrast, non-panchromatic type, in which case it may be handled under suitable red light. After drying, and while still under the aforementioned lighting conditions, the face of the cathode ray tube has the characteristics of a glass photographic plate; ready for exposure in the circuit of apparatus illustrated in Fig. 3.

Referring now to Fig. 3, there is illustrated the means for exposing the sensitive film 21 of cathode ray tube 11 to provide a uniform, orthogonal coordinate system as illustrated in Figs. 1 and 2. Generally, the apparatus of Fig. 3 includes means for applying normal operating potentials to the electrodes (schematically indicated) of the tube 11 so as to produce an electron beam, represented by broken line 41, focussed to a sharply defined spot on fluorescent screen 16 (Fig. 2). Automatic means are provided for deflecting and blanking the electron beam 41 in a pre-set pattern, thereby exposing the film 21 to the luminous trace of the spot.

In detail, the cathode ray tube 11 is energized from a conventional type power supply including a filament transformer 42, the primary of which is connected to a suitable alternating current source, not shown, and a resistance voltage divider 43, connected between ground and a negative direct power source at terminal 44. Cathode 45 is connected within the tube to one side of filament 46, which in turn is returned to an adjustable tap 47 on divider 43. Control grid 51, whose potential relative to cathode 46 determines the intensity of the luminous spot, is returned to tap 52, the most negative point on divider 43. The focussing electrode 53 is connected to resistor 43 at adjustable tap 54, and the second anode 55 is returned to ground, that is, the most positive point of voltage divider 43. The circuit connections of the tube 11 illustrated in Fig. 3, are conventional for an electron gun consisting of electrodes 46, 51, 53, and 55, and are adjusted to produce a sharp spot on the screen. The actual potentials used are dependent upon the size and type of cathode ray tube, and adjustment for focus and intensity is preferably made on a similar tube which is unfilmed.

Tube 11 is shown in Fig. 3 with electrostatic deflection means, including horizontal and vertical deflection plates 56 and 57 respectively; however, the apparatus shown is applicable with little modification to electromagnetically deflected tubes. Horizontal deflection plates 56 are coupled through the left hand two contacts of four pole-double throw switch 61 to the output of a sweep generator 62. The signal output of generator 62 is preferably a continuous large amplitude sawtooth wave of comparatively high frequency, which serves to deflect the electron beam 41 to form a substantially straight line trace at least equal to the tube face diameter. With the switch 61 in the position shown, the trace is a horizontal line, and as will be evident from consideration of the drawing, when the arms of switch 61 are thrown down to the opposite position, the vertical deflection plates 57 are connected to the sweep generator 62. For maintaining an optimum potential distribution within the tube, the output of generator 62 is preferably push-pull with respect to second anode potential, that is, ground.

In Fig. 3, the vertical deflection plates 57 of cathode ray tube 11 are coupled through the right hand two arms of switch 61 to the rotating arms 63 and 64 of a three circuit rotary switch or commutator 65. Associated with rotating arms 63 and 64 are a plurality of equally and circularly spaced contacts 66 and 67 respectively. Contacts 66 are regularly spaced about and coupled to a voltage divider resistor 71, shown as a circular element to indicate the symmetrical relation. Resistor 71 is energized at terminals 72 and 73, positive and negative respectively, relative to the center tap 74 which is grounded. In a similar manner, switch contacts 67 are uniformly spaced around a resistance element 75, energized at terminals 76 and 77, negative and positive respectively. relative to the resistor center tap 81, which is grounded. Thus, for a given direction of rotation of switch arms 63 and 64, the potentials thereat vary oppositely, but in equal steps, provided of course that the potential applied between terminals 72 and 73 equals in magnitude that between terminals 76 and 77.

Evidently, in Fig. 3, the instantaneous potential of one of the vertical deflection plates 57 is as positive with respect to ground as the other is negative. However, the average potential between the two plates 57 is equal to zero, or ground; the potential of the second anode 55. Thus, the vertical deflection plates are effectively driven in push-pull, a desirable relation as previously mentioned in connection with the signal input to horizontal plates 56. When switch 61 is thrown to the position opposite to that illustrated in Fig. 3, the connections to the horizontal and vertical plates are interchanged, whereby the potentials at switch arms 63 and 64 are applied to the horizontal plates.

Returning to the consideration of operation with the arms of switch 61 in the upper position as illustrated, it may be seen that rotation of arms 63 and 64 over contacts 66 and 67 respectively, while the horizontal plates 56 are coupled to the sweep generator 62, will result in a horizontal trace which will be in effect, "stepped" across the screen 16 of the tube 11. The extent of each of these steps is dependent upon the potential difference between adjacent contacts 66 and 67. The number of steps is of course dependent upon the total number of contacts 66, or 67, and all steps are of equal potential.

As the contact arms 63 and 64 are rotated, light emitted from the trace exposes the light sensitive coating 21 on the face of cathode ray tube 11. In order to preclude "fogging" of the entire sensitized surface, and to obtain distinct lines, the control grid 51 is "blanked" in a stepped pattern to extinguish the beam 41 during periods when the potentials of the deflection plates are correspondingly stepped. For this purpose rotating arm 83 of switch 65 is connected to the cathode 45, and is associated with a cooperating ring of contacts such as 84 and 85, connected to conducting rings 86 and 87 respectively, the latter in turn being connected to adjustable taps 91 and 92 respectively. Ordinarily, the voltage drop between cathode and control grid taps 47 and 52 is sufficient to blank out or extinguish the beam 41. With switch arm 83 in the position shown in Fig. 3, the resistance element 43 between cathode tap 47 and tap 92 is short circuited, thereby rendering cathode 45 less positive with respect to grid 51 and "unblanking" the beam 41 to provide a visible trace of a predetermined intensity. Slight rotation of arm 83 will remove this short circuit and blank the beam. Rotation to the next contact will, due to its connection to conducting ring 86, short circuit the resistance 43 between taps 47 and 91, thus lowering the potential difference between cathode 45 and grid 51, but to a lesser extent than that while at the previous contact, whereby the amount of "unblanking" is less, and the visible trace is of lower luminous intensity. Thus, as arm 83 is rotated, the beam 41 is successively blanked and unblanked, alternate periods of unblanking producing alternate intense and less intense traces on screen 16.

The three rotatable arms 63, 64, and 83, are mechanically ganged, as is schematically indicated by broken line 95. During a complete revolution of these three arms, with switch 61 in the position shown, the horizontal trace is stepped across the screen of tube 11, and blanked between steps. Alternate lines are of first and second intensities. By bringing the arms of switch 61 to the lower or opposite position in Fig. 3, and rotating ganged arms 63, 64, and 83, through another complete revolution, a vertical trace is similarly stepped across the screen 16.

It will be observed that contacts 66 and 67 subtend a somewhat greater arc than contacts 84 and 85. As a result, during rotation of arms 63, 64, and 83, beam 41 is blanked before the deflecting plate potentials are altered.

As the trace steps across the screen 16, the light sensitive emulsion 21 is exposed through glass face 15; the exposure being greater when arm 83 engages contacts 85 than when arm 83 engages contacts 84. To expose a complete rectangular coordinate system of the type shown in Figs. 1 and 2, it is merely necessary to rotate ganged arms 63, 64, and 83, through one complete revolution, throw arms of switch 61 to the opposite position, and rotate arms 63, 64, and 83, through another complete revolution. This may be accomplished manually; but for uniformity of exposure time, it is preferable to utilize the automatic arrangement disclosed in Fig. 3. Thus, the arms of switch 61 and ganged arms 63, 64, and 83, are mechanically coupled to a timing drive unit 96, as represented by broken lines 97 and 95, respectively. The timing unit is in turn driven from a small motor 101. Timing unit 96 is arranged so that when energized it will drive switches 61 and 65 through one complete calibrating cycle, that is, one revolution of arms 63, 64, and 83, reversal of switch 61 and another revolution of arms 63, 74, and 83. The application of this automatic calibration arrangement greatly facilitates mass calibration of tubes such as shown in Fig. 1.

As shown in Fig. 3, the tube 11 is enclosed in a grounded magnetic shield 102, to avoid effects of stray fields. The tube may of course be calibrated within whatever type of shield is ultimately to be associated therewith. If desired, the tube may be calibrated within the equipment in which it is to be furnished.

Upon exposure in the apparatus of Fig. 3, the sensitized film 21 of tube 11 is processed. The processing required is a function of the type of coating 21 used. For the conventional photographic emulsion, processing includes the steps of development, rinsing, and fixing. This may be carried out in a manner similar to that disclosed in connection with Fig. 4, except that the emulsion 31 is successively replaced by the required developer, rinse, and fixer. Since there is a tendency for light from the luminous trace obtained during exposure to spread in passing through glass face 15, it is preferred that development be carried out for a comparatively short time in a high contrast developer, thereby providing distinct markings, as shown in Figs. 1 and 2.

Fixing of the sensitive film 21 is followed by a final rinse and drying, at which point the cathode ray tube 11 is complete with fixed markings of a coordinate system, which conform precisely to the surface of glass face 15. The photographic emulsion may be protected by a suitable coating of transparent varnish or the like. However, for particular applications, other final treatments may be employed, as for example, etching the glass face 15 with acid, through the coordinate lines.

The rectangular coordinate system of lines such as 23 and 24 Fig. 1, provides accurate means for studying signal waveforms. It is to be emphasized that due to the variation of deflection sensitivity over the screen surface characteristic of cathode ray tubes, the physical spacing between lines of the coordinate system shown will not necessarily be uniform. However, the space between two adjacent lines is truly representative of a predetermined deflection potential and independent of the variable physical spacing therebetween, since the potential change at the cathode ray tube deflection plates for all steps during rotation of ganged switch arms 63 and 64 is of constant value. Thus, each tube so prepared is literally "custom" calibrated.

For some experimental purposes, it is often necessary to know merely relative magnitudes, in which case, the marked tube of Fig. 1 may be employed without further calibration. The waveform may be amplified so that it covers the tube screen out to the edges thereof, without fear of error due to non-linearity of the scale. For precise measurement, the coordinate scale may be readily and rapidly calibrated by a single determination of the deflection potential required to produce a spot deviation of one division in whatever circuit the tube is incorporated. Parallax errors are obviated as a result of the uniform proximate relation between the processed layer 21 and the fluorescent screen 16.

The broad principles hereinabove disclosed may be utilized as a basis for obtaining a cathode ray tube coordinate system or marking of any desired form. For example, blanking switch contacts 84 and 85 may all be returned to the same point on resistor 43, so lines of equal intensity are obtained over the entire cathode ray tube sensitized layer 21. Conversely, contacts of this switch may be returned to resistor 43 so that more than two intensities are obtained. Thus, conventional scales having ten spaces to the inch, with a number of fine line subdivisions between heavy main divisions, may readily be duplicated. A complete rectangular coordinate system need not always be applied, as accurately placed X and Y axes are often the sole requirement.

A polar plot may be obtained by arrangement of rotary switches such as 65, Fig. 3, to provide "stepped" concentric circles. The potentials applied to the horizontal and vertical deflection plates are, for this example, equal amplitude sine waves, precisely 90 degrees out of phase. Radial lines may be applied using the same fundamental techniques.

It is thus apparent that numerous modifications and extensions of the principles herein disclosed will become evident to those skilled in the art. Accordingly, it is preferred that this invention be limited solely by the spirit and scope of the appended claims.

The invention described herein may be manufactured and used by or for the Government of the United States of America for governmental purposes without the payment of any royalties thereon or therefor.

What is claimed is:

1. A cathode ray tube having a light sensitive coating thereon exposed in accordance with a luminous pattern generated within said tube.

2. A cathode ray tube having a processed photographic emulsion adhering thereto said emulsion bearing markings indicative of an electrical characteristic of said tube.

3. A cathode ray tube having photographically prepared calibration markings thereon.

4. In combination with a cathode ray tube having a fluorescent screen, a light sensitive substance, said light sensitive substance adhering to said cathode ray tube in proximate relation with said fluorescent screen.

5. A cathode ray tube comprising, means for producing an electron beam, means responsive upon impact of said electron beam for producing a luminous spot, and a processed light sensitive substance adhering to said cathode ray tube adjacent said first mentioned means, said substance being marked in accordance with a predetermined deflection pattern of said luminous spot.

6. A cathode ray tube comprising, an electron gun for producing an electron beam, a fluorescent screen responsive upon impact of said electron beam for producing a luminous spot, means for deflecting said spot, and a processed photographic emulsion adhering to said cathode ray tube and marked in accordance with a predetermined deflection pattern of said luminous spot to provide an individual coordinate system for said cathode ray tube.

7. A cathode ray tube comprising, an electron gun for producing an electron beam, a fluorescent screen responsive upon impact of said electron beam for producing a luminous spot, means for varying the luminous intensity of said spot, and a processed light sensitive coating adhering to said cathode ray tube adjacent said fluorescent screen, said coating being marked in accordance with a predetermined deflection and intensity variation pattern of said luminous spot, said coating thereby providing an individual coordinate system of variable intensity markings for said cathode ray tube.

8. A calibration scale on the face of a cathode ray tube comprising, a system of substantially orthogonal lines, said lines being photographically prepared upon exposure to light emitted from a substantially straight line trace on the fluorescent screen of said cathode ray tube, said trace being deflected across said fluorescent screen in predetermined steps in mutually perpendicular directions.

9. The method of marking a cathode ray tube, which includes the steps of coating part of said tube with a light sensitive substance, and exposing said substance to the luminous spot of said tube.

10. The method of marking a cathode ray tube, which comprises the steps of coating part of said tube with a light sensitive substance, exposing said substance to the luminous spot of said tube as deflected in a predetermined pattern, and processing said light sensitive substance.

11. The method of marking a cathode ray tube having a fluorescent screen and means adapted to produce a luminous spot thereon, which comprises the steps of applying a photographic light sensitive emulsion to said cathode ray tube, exposing said emulsion to light emitted from said luminous spot as deflected in a predetermined pattern, and processing said photographic emulsion.

12. The method of marking a cathode ray tube having a fluorescent screen, means adapted to produce a luminous spot on said screen, means for deflecting said spot, and means for varying the luminous intensity of said spot, which method comprises the steps of applying a photographic light sensitive film to said tube in proximate relation with said fluorescent screen, exposing said film to light emitted from said luminous spot, energizing said spot deflecting means and said intensity varying means with signals in a predetermined stepped pattern, and developing and fixing said light sensitive film.

13. The method of marking a rectangular coordinate system of lines on the face of a cathode ray tube, which comprises the steps of applying a light sensitive coating to said tube face, energizing said cathode ray tube with substantially normal operating potentials to provide a luminous spot on said tube face, sweeping said spot in a first direction parallel to an axis of said coordinate system while deflecting said spot in distinct steps perpendicular to said axis, sweeping said spot in a second direction perpendicular to said axis while deflecting said spot in distinct steps parallel to said axis, and processing said light sensitive coating.

14. The method of marking a rectangular coordinate system of lines on the face of a cathode ray tube, which comprises the steps of applying a light sensitive coating to said tube face, energizing said cathode ray tube with substantially normal operating potentials to provide a luminous spot on said tube face, sweeping said spot in a first direction parallel to an axis of said coordinate system while deflecting said spot in distinct steps perpendicular to said axis, sweeping said spot in a second direction perpendicular to said axis while deflecting said spot in distinct steps parallel to said axis, blanking and unblanking said luminous spot during each of said distinct steps, and processing said light sensitive coating.

15. Apparatus for marking a cathode ray tube having a light sensitive coating thereon comprising, means for energizing said cathode ray tube to provide a spot exposing said light sensitive coating, and means for deflecting said spot in a predetermined pattern.

16. Apparatus for marking a cathode ray tube having a photographic light sensitive coating adhering thereto in proximate relation with the fluorescent screen of said tube, said apparatus comprising, means for applying operating potentials to said tube to provide a luminous spot on said fluorescent screen thereby exposing said light sensitive coating, means for deflecting said luminous spot in predetermined steps to trace out a coordinate system, and means cooperating with said deflecting means for blanking and unblanking said luminous spot.

17. Apparatus for marking a cathode ray tube having a fluorescent screen, an electron gun, horizontal and vertical deflection means, and a light sensitive coating adhering to said tube in proximate relation with said fluorescent screen, said apparatus comprising, means for energizing said electron gun to provide a luminous spot on said fluorescent screen, a sweep generator coupled to said horizontal deflection means, means for applying a deflection signal to said vertical deflection means, means for varying said vertical deflection signal in predetermined steps, means for blanking said luminous spot while varying said vertical deflection signal, and switching means for interchanging said connections to said horizontal and vertical deflection means.

18. Apparatus for providing a system of rectangular coordinate calibration markings for a cathode ray tube, said cathode ray tube having a fluorescent screen, an electron gun, horizontal and vertical deflection plates and a light sensitive coating adhering to the face of said cathode ray tube in proximate relation with said fluorescent screen, said apparatus comprising, means for energizing said electron gun to provide a luminous spot on said fluorescent screen thereby exposing said light sensitive coating, a sweep generator coupled to said horizontal deflection plates through first switching means, second switching means coupled to said vertical deflection plates through said first switching means, a source providing a plurality of predetermined deflection potentials coupled to said second switching means, said second switching means thereby applying one of said plurality of deflection potentials to said vertical deflection plates, means including said second switching means for selectively applying others of said plurality of potentials to said vertical deflection plates, means associated with said second switching means for blanking and unblanking said luminous spot, and means including said first mentioned switching means for interchanging the connections of said vertical and horizontal plates.

19. Apparatus as in claim 18, wherein said unblanking means provides a luminous spot of first or second intensities in a predetermined pattern, said first and second switching means being manually or automatically operable.

20. An electron tube having markings thereon photographically prepared and related to predetermined movement of electrons therein.

21. An electron tube having a viewing screen and markings for said screen, said markings being photographically prepared and bearing a predetermined relation to deflection of an electron beam within said tube.

22. A cathode ray tube having a processed photographic emulsion thereon, said emulsion bearing markings of a plurality of intensities corresponding to predetermined electron beam intensities within said cathode ray tube.

23. A cathode ray tube having processed light sensitive means thereon, said means bearing markings of a plurality of intensities in a predetermined pattern corresponding to predetermined electron beam intensities and deflections within said cathode ray tube.

24. A cathode ray tube having a viewing screen and a plurality of markings processed thereon in proximate relation with said screen.

25. A cathode ray tube having a fluorescent screen and an individual coordinate system processed thereon in proximate relation with said fluorescent screen.

26. A calibration scale for a cathode ray tube comprising a system of lines photographically prepared upon exposure to light representative of the trace on the screen of said cathode ray tube, said trace having a predetermined deflection and intensity pattern.

27. A cathode ray tube comprising, an electron gun for producing an electron beam, a fluorescent screen responsive upon impact of said electron beam for producing a luminous spot and a processed light sensitive coating adhering to said cathode ray tube in proximate relation with said fluorescent screen, said coating having therein an individual orthogonal coordinate system for said cathode ray tube, the spacing of adjacent lines of said system being at all points representative of a predetermined electron beam deflection signal.

28. The method of marking a cathode ray tube comprising the steps of sweeping the electron beam of said cathode ray tube in a predetermined pattern, and photographically recording upon said tube predetermined portions of the path of said beam.

29. The method of marking a cathode ray tube, which includes the steps of applying a light sensitive substance to at least part of said tube, and exposing predetermined portions of said substance to a luminous source within said tube.

30. The method of marking a cathode ray tube having a fluorescent screen and means adapted to produce a luminous spot thereon, which includes the steps of applying a photographic light sensitive emulsion to said cathode ray tube, sweeping said luminous spot in a predetermined pattern, and photographically recording upon said emulsion predetermined portions of the path of said spot.

31. The method of marking a rectangular coordinate system of lines on the face of a cathode ray tube, which comprises the steps of applying a light sensitive coating to said tube face, energizing said cathode ray tube with substantially normal operating potentials to provide a luminous spot on said tube face, sweeping said spot in a first direction parallel to an axis of said coordinate system while deflecting said spot in distinct steps perpendicular to said axis, sweeping said spot in a second direction perpendicular to said axis while deflecting said spot in distinct steps parallel to said axis, blanking said luminous spot during each of said distinct deflecting steps, unblanking said luminous spot for an interval subsequent to each of said deflecting steps, thereby exposing lines upon said light sensitive coating and precluding exposure of said coating between said exposed lines, and processing said light sensitive coating to reveal said exposed lines.

32. The method of marking a cathode ray tube having a fluorescent screen, which comprises the steps of, forming a predetermined image upon said fluorescent screen, and substantially permanently recording said image upon said cathode ray tube in proximate relation to said fluorescent screen.

33. The method of marking a system of lines upon a cathode ray tube, which includes the steps of energizing said cathode ray tube to provide a luminous trace, and substantially permanently recording upon said tube a predetermined intensity and deflection pattern of said trace.

34. Apparatus for marking a cathode ray tube comprising means for energizing said cathode ray tube for providing a trace, and means for substantially permanently recording upon said tube a predetermined deflection and intensity pattern of said trace.

35. Apparatus as in claim 18 wherein said source providing deflection potentials is arranged to supply said potentials in push-pull relation to said horizontal or vertical deflection plates through said second switching means.

36. Apparatus for marking a cathode ray tube having deflection means associated therewith comprising, a source of push-pull deflection signals, switching means for applying deflection signals from said source to said deflection means in a predetermined order, and means for recording on said tube the deflection effects of said application of said deflection signals.

37. Apparatus for marking a cathode ray tube having electron beam blanking and deflection means associated therewith and a photographic light sensitive coating adhering thereto in proximate relation with the fluorescent screen of said tube, said apparatus comprising, a rotary switching unit having multiple contact switch sections electrically connected to said deflection means and to said blanking means, a source of push-pull deflection signals coupled to said switch section connected to said deflection means, a source of blanking signals coupled to said switch section associated with said blanking means, said apparatus being arranged whereby upon actuation of said rotary switch, said deflection and blanking signals are applied to said deflection and blanking means, respectively, in a predetermined order, said multiple contact switch sections being arranged whereby said blanking signals are each applied to said cathode ray tube for time intervals greater than the intervals of application of said deflection signals, whereby said light sensitive coating is exposed in distinct steps in periods between the application of said blanking signals.

38. Apparatus for calibrating the screen of a cathode ray tube having first and second deflection systems comprising, means for applying to said first and second deflection systems first and second deflection signals respectively, and means operative for interchanging connections and applying to said first and second deflection systems said second and first deflection signals, respectively.

JOSEPH WEINGARTEN.

REFERENCES CITED

The following references are of record in the file of this patent:

UNITED STATES PATENTS

| Number | Name | Date |
|---|---|---|
| Re. 22,115 | Herbst | June 16, 1942 |
| 1,818,760 | Selenyi | Aug. 11, 1931 |